United States Patent
Mannering et al.

(10) Patent No.: US 6,404,804 B1
(45) Date of Patent: Jun. 11, 2002

(54) CIRCUITS, SYSTEMS, AND METHODS FOR ERROR ELIMINATION IN A DIGITAL SUBSCRIBER LINE MODEM

(75) Inventors: Dennis G. Mannering, Garland; Song Wu, Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/109,340

(22) Filed: Jun. 30, 1998

Related U.S. Application Data

(60) Provisional application No. 60/059,183, filed on Sep. 17, 1997.

(51) Int. Cl.[7] .............................. H04B 1/38; H04L 5/16; H04L 27/00; G06F 11/00; G08C 25/00
(52) U.S. Cl. ...................... 375/222; 375/259; 714/704; 714/799
(58) Field of Search ................................. 375/222, 219, 375/260, 259, 316, 377; 714/704, 48, 799, 819, 820, 822

(56) References Cited

U.S. PATENT DOCUMENTS 5,822,331 A * 10/1998 Ugawa ........................ 714/704

6,064,693 A * 5/2000 Oliver et al. ................ 375/222

* cited by examiner

Primary Examiner—Betsy L. Deppe
(74) Attorney, Agent, or Firm—J. Dennis Moore; W. James Brady, III; Frederick J. Telecky, Jr.

(57) ABSTRACT

A method (50) of communicating bit groups between a first DSL modem ($M_{14}$) and a second DSL modem ($M_{12}$). The method receives (56) at the first DSL modem a plurality of bit groups ($FF_1$–$FF_{500}$) from the second DSL modem. Each of the plurality of bit groups comprises a plurality of bit sub-groups ($W_1$–$W_{12}$), and each of the plurality of bit sub-groups has an order of location. For each of the plurality of bit groups, the method determines (58) whether bits of at least one sub-group having a common order of location comprise at least one erroneous bit. In response to this determination, the method stores (62, 64) in the first DSL modem a record (InMaskBuff) of whether the at least one sub-group having the common order of location comprises at least one erroneous bit. From this record, various other steps (72) may be taken in the preferred embodiment, including suppressing (82) the at least one sub-group from communicating valid information from the second DSL modem to the first DSL modem.

34 Claims, 5 Drawing Sheets

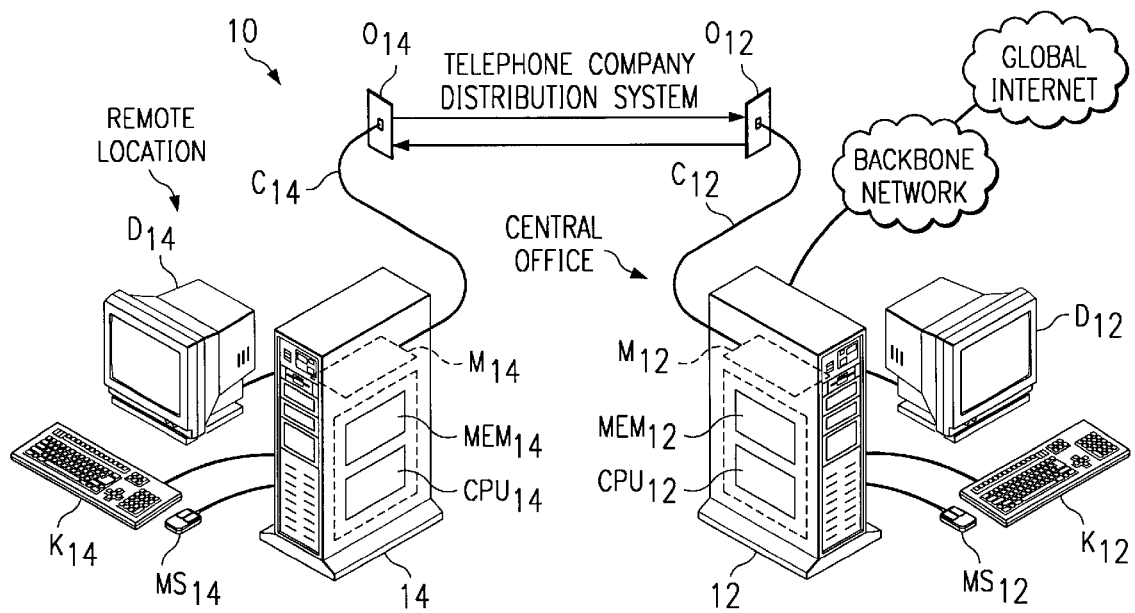
FIG. 1
FIG. 3
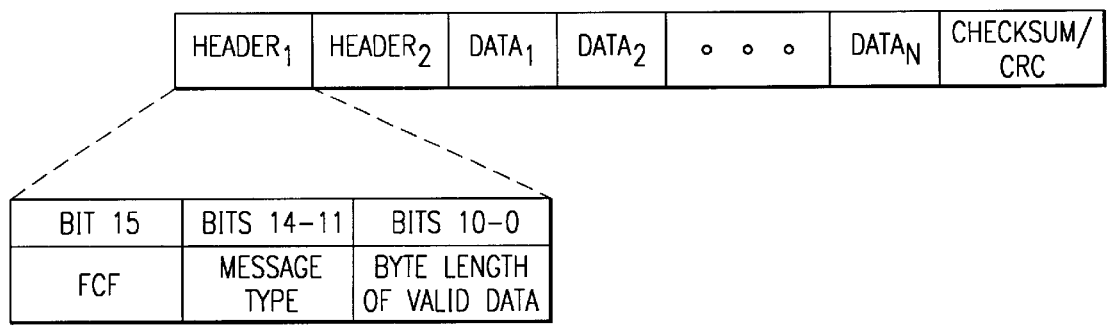
FIG. 4

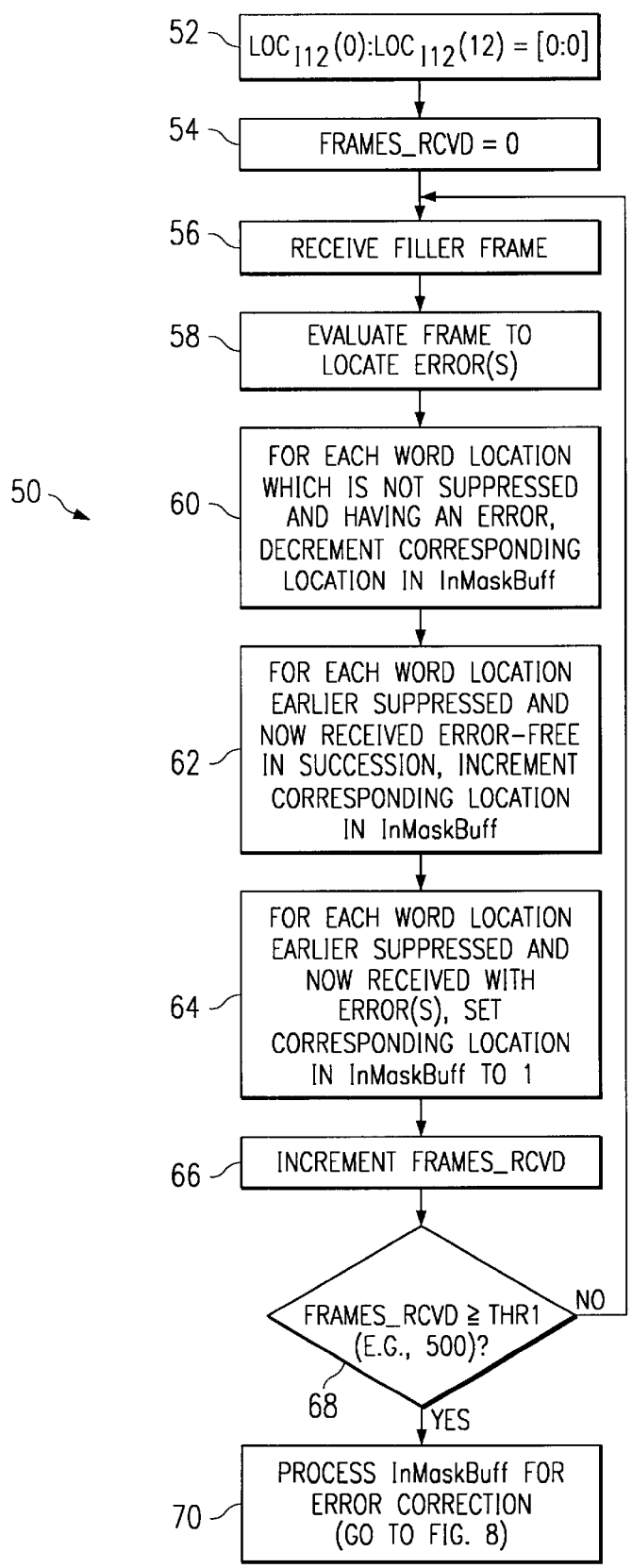

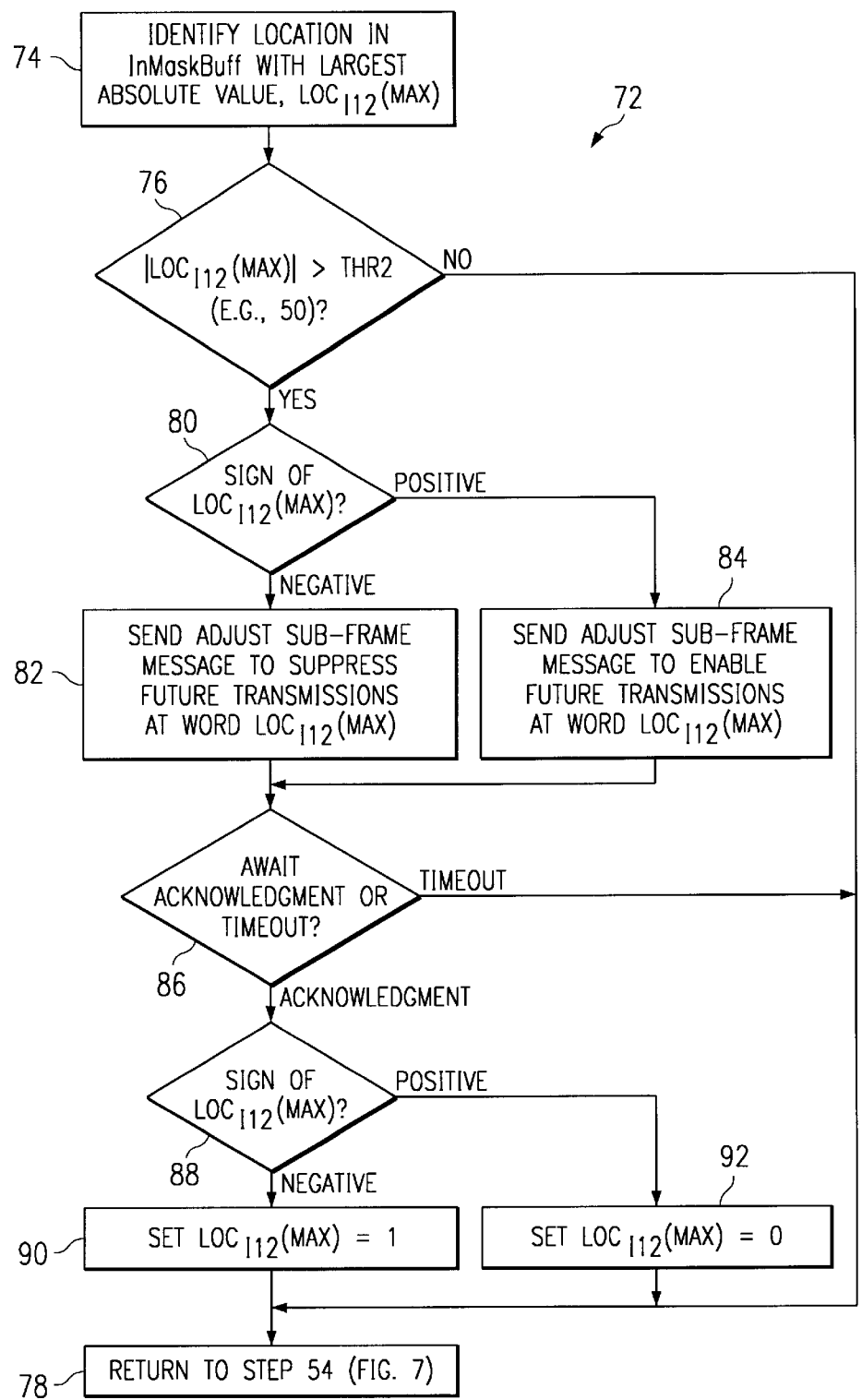

CIRCUITS, SYSTEMS, AND METHODS FOR ERROR ELIMINATION IN A DIGITAL SUBSCRIBER LINE MODEM

CROSS-REFERENCES TO RELATED APPLICATIONS

This application claims the benefit, under 35 U.S.C. § 119(e)(1), of U.S. Provisional Application No. 60/059,183, entitled "MDSL-DMT MODEM DYNAMIC ERROR ELIMINATION AT THE MESSAGE FRAMING LEVEL," having as its inventors Mr. Dennis G. Mannering and Mr. Song Wu, filed Sep. 17, 1997, and incorporated herein by this reference.

STATEMENT REGARDING FEDERALLY SPONSORED RESEARCH OR DEVELOPMENT

Not Applicable.

BACKGROUND OF THE INVENTION

The present embodiments relate to telecommunications systems, and are more particularly directed to circuits, systems, and methods for error elimination in a digital subscriber line modem.

The exchange of digital information between remotely located computers is now a pervasive part of modern computing, and occurs in all sorts of contexts including business, education, and personal computer use. In addition, such uses by all current predictions appear to be even more desirable in the future. Video on demand ("VOD") is one area which has for some time driven the advancement of technology in this area. More recently, the rapid increase in use and popularity of the Global Interet (hereafter, the "Internet") has perhaps surpassed the excitement created by VOD. This Internet focus also has further motivated research and preliminary development of systems directed to advanced communication of information between remotely located computers. These factors as well as the continuing evolution of computer information exchange give rise to the present embodiments.

One type of technology arising from the above and continuing to evolve is referred to in the art as digital subscriber line ("DSL"). DSL is a public network technology that delivers relatively high bandwidth over conventional telephone company copper wiring at limited distances. As explored briefly below, DSL has been further separated into several different categories. All of these differing DSL categories are currently developing, some at different rates than others. In any event, the evolution prevents an absolute definition of any specific DSL category, but some observations may be made at the current time and are explored below.

Given the various DSL technology categories, it may be stated that each differs in some respects while each also shares some similarities. As to differences of the DSL categories, they may diverge in one or more of the expected data transfer rate, the medium type and length over which data are communicated, and the scheme for encoding and decoding data for communication. As to the similarities of the DSL technologies, generally speaking each DSL system is provisioned into modem pairs. One modem of the modem pair is located at a customer site. The other modem of the modem pair is located at the site of an owner, or controller, of a twisted conductor pair network. Currently, the most evident owner or controller is a telephone company central office. Within the telephone company system, its modem is connected to communicate with some type of network, often referred to as a backbone network. The backbone network is further coupled in a network manner to provide other communication paths to and from the backbone network. These other paths are often accomplished through the use of routers, and more recently it has been proposed to eliminate routers in favor of a hardware device referred to as a digital subscriber line access multiplexer ("DSLAM"). In any event, given its network nature, the backbone network may further communicate with other information sources and, most notably under current technology, with the Internet. Thus, information accessible to the backbone network, such as Internet information, may be communicated between the central office DSL modem and a customer site with its own compatible DSL modem. Within this general system, it is also anticipated that data rates between DSL modems may be far greater than current voice modem rates. Indeed, current DSL systems being tested or projected range in rates on the order of 500 Kbps to 18 Mbps, or even faster. As explored briefly below, however, note that the higher rates for some DSL systems are only for so-called downstream communications, that is, from the central office to the customer site; thus, for those systems, communication in the other direction (i.e., upstream from the customer site to the central office) is generally at a rate considerably lower than the downstream rate. Lastly, note that most DSL technologies do not use the whole bandwidth of the twisted pair and, thus, often reserve low bandwidth for a voice channel. As a result, while a line is being used by a DSL system, the same line may concurrently communicate a voice conversation as well.

Briefly looking at perhaps the most publicized DSL technology currently being developed, it is referred to as Asymmetric Digital Subscriber Line, or "ADSL." ADSL has been standardized by ANSI as seen by its T1.413 standard. However, even given that standard, there continues to be debate and competition as to whether devices complying with the standard provide promise for future wide scale use, and indeed whether the standard requires revision. For example, the standard currently contemplates a modulation technology called Discrete Multitone (DMT) for the transmission of high speed data, but it could be that the standard may further include alternative data transmission techniques in the future. In any event, given the state of the art discussion of ADSL systems, it is contemplated that they will communicate over a single copper twisted pair, and provide downstream rates on the order of 1.5 Mbps to 9 Mbps, while upstream bandwidth will range from 16 kbps to 640 kbps. Along with Internet access, telephone companies are considering delivering remote local area network ("LAN") access and VOD services via ADSL.

As to other DSL categories being developed, they include High-Bit-Rate Digital Subscriber Line ("HDSL"), Single-Line Digital Subscriber Line ("SDSL"), and Very-high-data-rate Digital Subscriber Line ("VDSL"). HDSL, unlike ADSL as described above, has a symmetric data transfer rate, that is, it communicates at the same speed in both the upstream and downstream directions. Current perceived speeds are on the order of 1.544 Mbps of bandwidth, but require two copper twisted pairs. HDSL's operating range is more limited than that of ADSL, and is currently considered to be effective at distances of approximately 12,000 feet. Beyond such a distance, HDSL communication requires signal repeaters to extend the service. SDSL delivers a comparable speed and also a symmetric data transfer as compared to HDSL, but achieves these results with a single copper twisted pair. However, the operating range of an SDSL system is limited to approximately 10,000 feet. Lastly, VDSL provides asymmetric data transfer rates, but anticipates much higher speeds than those competing DSL technologies described above. Currently, rates over a single twisted copper pair on the order of 13 Mbps to 52 Mpbs downstream, and 1.5 Mbps to 2.3 Mbps upstream, are contemplated. Note, however, that such rates are expected to operate only over a range of 1,000 to 4,500 feet.

Given the many variations of DSL technology as introduced above, it is known that for an effective communication system there must be considerations directed to error reduction or elimination in the communication between DSL modems. More specifically, DSL modems typically perform some type of error detection during initialization, and based on the detected errors make adjustments so that post-initialization communications operate to avoid these errors. For example, under the current ADSL standard, DMT modulation is used for the transmission of high speed data, and during initialization there is a determination of "bit loading," that is, how bits are allocated to the different frequency channels of the communication. This bit loading, therefore, may be corrected due to detected errors during initialization. However, for this or alternative approaches, it is recognized in connection with the present inventive embodiments that different errors (e.g., noise) may occur in modem operation after initialization, that is, new noises may arise which were not present during initialization. Accordingly, these noises may cause errors in the data transmitted between modems. Still further, the effect of these noises many not be constant; for example, noises may start and stop, and may change frequency.

From the above, it is further recognized that DSL modems must provide error correction functionality. In this regard, various DSL technologies under development contemplate differing approaches. For example, some DSL modems propose a Reed-Solomon integrated circuit Still others implement some other application specific integrated circuit ("ASIC") to separately perform an error correction capability. In either of these approaches, however, the benefit from the correction must be measured against its costs. For example, the complexity and added hardware to implement these approaches may outweigh the benefit of the correction technology. As another example, these approaches are heavily constrained in hardware. Thus, if a change in the approach is thereafter desired, the fixed hardware approach may be rendered useless if it will not accommodate a new or changed approach. As another and perhaps most important example for a technology having such broad potential dissemination, extreme complexity may increase the cost of implementing the technology to an unacceptable level. Given the above, the present inventors set forth below various inventive embodiments which seek to overcome the discussed drawbacks as well as others which may be ascertained by one skilled in the art

BRIEF SUMMARY OF THE INVENTION

In one preferred embodiment, there is a method of communicating bit groups between a first DSL modem and a second DSL modem. The method receives at the first DSL modem a plurality of bit groups from the second DSL modem. Each of the plurality of bit groups comprises a plurality of bit sub-groups, and each of the plurality of bit sub-groups has an order of location. For each of the plurality of bit groups, the method determines whether bits of at least one sub-group having a common order of location comprise at least one erroneous bit. In response to this determination, the method stores in the first DSL modem a record of whether the at least one sub-group having the common order of location comprises at least one erroneous bit. From this record, various other steps may be taken in the preferred embodiment, including suppressing the at least one sub-group from communicating valid information from the second DSL modem to the first DSL modem. Other circuits, systems, and methods are also disclosed and claimed.

BRIEF DESCRIPTION OF THE SEVERAL VIEWS OF THE DRAWING

FIG. 1 illustrates a preferred telecommunications systems implementing a first digital subscriber line ("DSL") modem in a corresponding host computer at a remote location and a second DSL modem in a corresponding host computer at a central location having access through a network to the global Internet;

FIG. 3 illustrates the preferred relationship of frames and messages;

FIG. 4 illustrates the preferred format for a message, and further details the information encoded in the header of each message;

FIG. 7 illustrates a flowchart of the preferred methodology of receiving a sequence of filler frame messages and recording a history of the accuracy of the bits of those messages; and FIG. 8 illustrates a flowchart of the preferred methodology of identifying a word location from a sequence of received filler messages, where the word location has been determined to have either a high incidence of errors or a high incidence of accuracy.

DETAILED DESCRIPTION OF THE INVENTION

Figure 2:
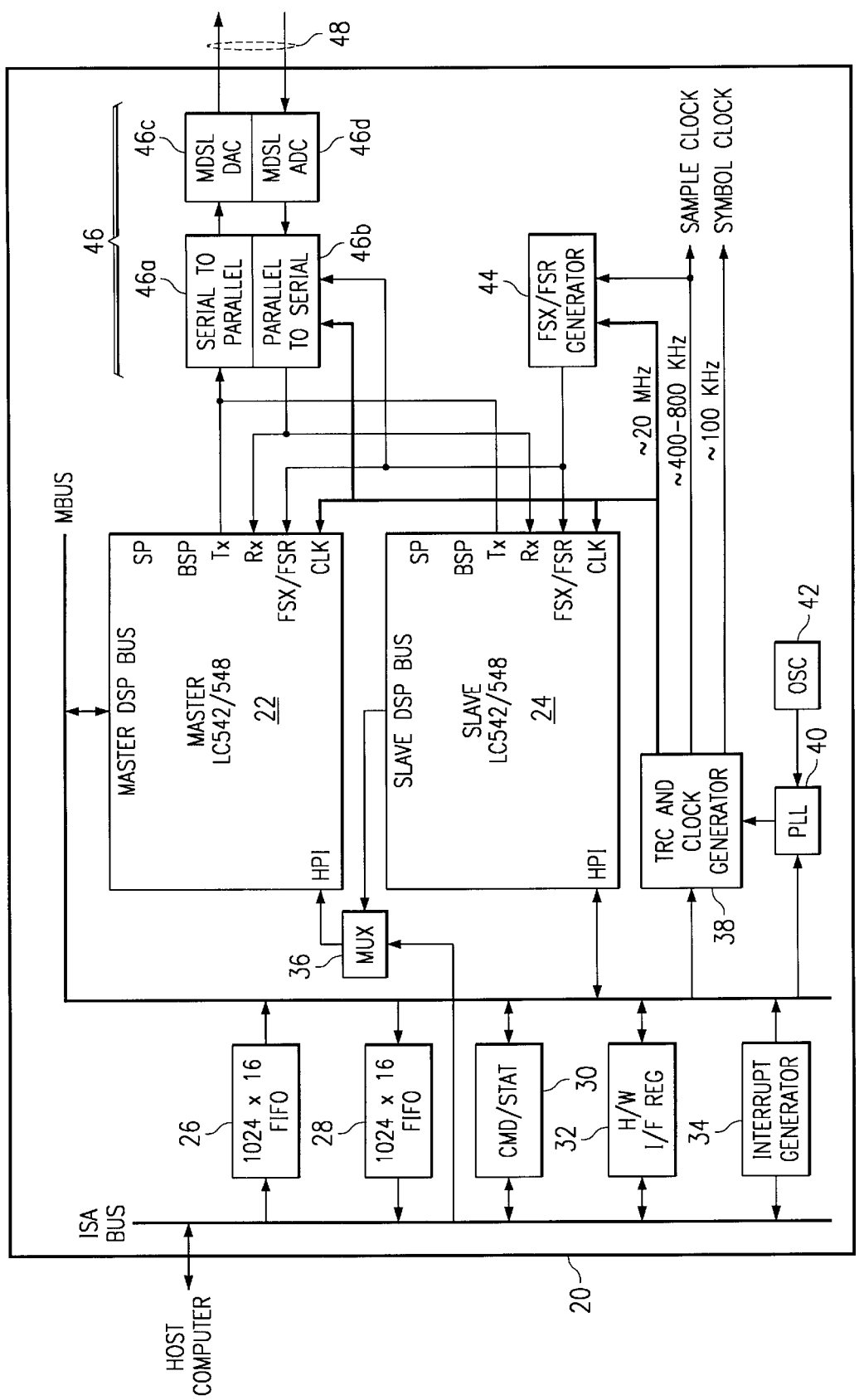
FIG. 2 illustrates a block diagram of a preferred DSL modem card.

FIG. 1 illustrates a system 10 depicting by way of example the context in which the present inventive embodiments may be implemented. By way of example, system 10 includes aspects which relate to two different geographic locations, one being a telephone company central office and the other being a location remote from that office and, hence, referred to in this document as a remote location. For purposes of appreciating a common example, the remote location may be a home or office of a user in that location, while the central office may be any of those types of offices included in a telephone company system. Stated simply, therefore, these two locations may be fairly close together, or vast distances apart, yet they both may benefit from the present embodiments. These benefits as well as the details of the inventive embodiments are presented below.

At a minimum for illustrating the preferred embodiments, each of the central office and remote location houses a computer 12 and 14, respectively. Computers 12 and 14 may be of any type of known computer configurations and, indeed, the type of computing device at the remote location may well differ from the type or configuration of that used at the central office (e.g., a rack system). Typically, therefore, a user of either computer may provide input to a corresponding computer, such as by way of a keyboard K and a mouse MS or other input or pointing device as known in the art. To simplify the present illustration, note for purposes of FIG. 1 that each of the reference identifiers for these items (i.e., K and MS) as well as for other items discussed below further includes a subscript reciting the reference number of the corresponding computer. For example, computer 12 includes keyboard $K_{12}$ and mouse $MS_{12}$. Continuing with this convention and looking to other attributes of computers 12 and 14, each computer preferably includes some device for presenting output to a user, such as a display D. Internally to each computer may be various circuits including those mounted on circuit boards and/or cards, including a motherboard (shown in phantom) which includes a memory MEM, a central processing unit CPU or more than one such CPU as may likely be the case for computer 12, and likely other circuitry (not shown). Of particular note to the present embodiments, also included preferably internal to each computer and, thus, shown in phantom, is a modem M so that each of computers 12 and 14 may communicate with one another over a standard telephone company distribution system. In the case of computer 12, note that it is likely to actually include and support multiple modems, although only one is shown to simplify the illustration as well as the following discussion. Looking to the distribution system along which the modems communicate, it includes twisted conductor pairs accessible for a connection between computers 12 and 14. In this regard, modem $M_{14}$ of computer 14 provides an output which is provided to a standard telephone or other applicable connector and, thus, is connected to a telephone wall outlet $O_{14}$ via a standard telephone communication cable $C_{14}$. This connection permits communication from modem $M_{14}$ over the telephone company distribution system and, therefore, with modem $M_{12}$ of computer 12. Note that while comparable connections using cable $C_{12}$ and outlet $O_{12}$ are shown at the telephone company, more typical industrial type connections may actually exist at that end of the connection. Lastly, given the communications of modems $M_{12}$ and $M_{14}$ with one another, note that in the preferred embodiment such communications are by way of a DSL category referred to as Medium-bit-rate Digital Subscriber Line (MDSL) technology, which currently contemplates downstream communications up to 2.8 Mbps and upstream communications up to 768 Kbps. One skilled in the art, however, will appreciate that many of the present teachings also provide aspects and benefits which may be implemented in other DSL categories.

Given system 10 of FIG. 1, it is intended that its components are used within the present inventive scope to accomplish DSL communications between modems $M_{12}$ and $M_{14}$. In this regard, note that computer 12 is connected via an appropriate interface I/F to a backbone network. This network may be of various types, with Ethernet being a popular contemporary example. As a result, computer 12 may communicate with any other device or resource which also is coupled to communicate with the backbone network. Indeed, as one example, FIG. 1 illustrates that the Internet is also coupled to the backbone network through some kind of networking architecture. Consequently, computer 12 may communicate, via the backbone network, with the Internet Additionally, due to the modem-to-modem communication path between computers 12 and 14, computer 14 also may use DSL communications for accessing other media available to computer 12 at the telephone company central office.

FIG. 2 illustrates a block diagram of a computer card modem 20 serving as the preferred embodiment for forming modems $M_{12}$ and $M_{14}$, with it understood under the preferred embodiment that a modem located at a remote site such as modem $M_{14}$ further includes sufficient circuitry for timing recovery while such circuitry is not included on a central office modem such as modem $M_{12}$. Turning now to the specific illustration of FIG. 2, modem 20 includes a first digital signal processor ("DSP") 22 and in the preferred embodiment includes a second DSP 24 as well. Currently, DSPs 22 and 24 are implemented as device numbers TMS320LC542 or TMS320LC548 commercially available from Texas Instruments Incorporated. However, it is contemplated that other DSPs may be used, and further that a single DSP may indeed be sufficient for alternative embodiments. Returning to the embodiment of FIG. 2, DSPs 22 and 24 are configured in the microcomputer mode where, in that mode, the internal memory of each DSP is divided to include 2K words of program memory and 10K words of program/data for the TMS320LC542, or to include 2K words of program memory and 32K words of program/data for the TMS320LC548. The division of the 10K or 32K words between program and data is programmable. Further with respect to DSPs 22 and 24, they are configured in a master/slave configuration, with DSP 22 serving as the master and DSP 24 serving as the slave. Thus, from this point forward, these DSPs are referred to as master DSP 22 and slave DSP 24. Master DSP 22 has access to all the peripheral circuits on modem 20 and also controls the operation of slave DSP 24. Additionally, in the preferred embodiment, a DSL algorithm for communicating data according to a DMT algorithm is implemented in master DSP 22, while a DSL algorithm for communicating data according to a CAP algorithm is implemented using both master DSP 22 and slave DSP 24.

Looking generally to the left of FIG. 2, modem 20 includes an industry standard architecture ("ISA") bus which provides the interface of modem 20 to a corresponding computer. In the preferred embodiment, the ISA bus is a accessed by way of a single full-sized 16 bit bus as typically available within an IBM compatible computer. Thus, modem 20 may be inserted into the full size slot having access to this ISA bus, and perform the functionality and interaction with the corresponding computer as described throughout this document Given this connection and that modems $M_{12}$ and $M_{14}$ are preferably implemented in this computer card fashion for internal installation into a corresponding computer, by way of convention for the remainder of this document each corresponding computer is referred to as a host computer with respect to its corresponding modem. Thus, in the example of FIG. 1, each of computers 12 and 14 is hereafter referred to as a "host" with respect to its corresponding modem $M_{12}$ and $M_{14}$. Similarly, since modem 20 is illustrative of either modem $M_{12}$ and $M_{14}$, it should be understood that when the host computer is referred to with respect to modem 20, it is intended to apply to that computer which corresponds to a particular use of modem 20. In any event, returning now to the particular structure of modem 20, the ISA bus communicates with various circuits, each of which is discussed below.

Two similar circuits communicating with the ISA bus include a FIFO 26 and a FIFO 28. The difference between FIFOs 26 and 28 is in the direction of the data path between the ISA bus and an internal modem bus designated the MBUS. In the preferred embodiment, each of FIFOs 26 and 28 is operable to store up to 1024 binary quantities, where each quantity is 16 bits wide. In operation, these quantities represent DSL data communicated from the host computer to modem 20 in the case of FIFO 26, and from modem 20 to the host computer in the case of FIFO 28. In other words, once a connection is established, the host computer may transmit DSL data via the ISA bus to FIFO 26, and that data is then ultimately communicated from modem 20 to a remote modem at another site. In a similar manner, when modem 20 receives DSL data from a remote site, it is communicated via the ISA bus to the host computer by presenting it in appropriate size quantities to FIFO 28.

The ISA bus is further connected to a command/status register 30 (abbreviated as CMD/STAT in FIG. 2) which is general purpose 16 bit bi-directional register. The number of storage entities of command/status register 30 may be chosen so as to accomplish various functionality such as that described in U.S. Pat. No. 6,104,749, entitle, "Message Frame And Flow Control In A Digital Subscriber Line Telecommunications System," which issued on Aug. 15, 2000, and is hereby incorporated herein by reference. In the preferred embodiment, this functionality includes the passage of commands from the host computer to modem 20, but in an alternative embodiment may further include the passage of commands from modem 20 to the host computer. The information stored in command/status register 30 also reports various status information from modem 20 to the host computer. In this regard, in the preferred embodiment the bits of command/status register 30 are not dedicated, but instead, they are loaded by master DSP 22 in response to a request from the corresponding host computer. In other words, at any given point a particular bit in command/status register 30 may represent one type of information in response to a request, while at another point the same bit may represent a different type of information. In any case, these types of information are preferably maintained in software by master DSP 22 for reporting to command/status register 30, and include a ringing/dialing bit, an acknowledgment bit, a ring-back bit, status bits, and a connection bit, each discussed later.

The ISA bus is further connected to a hardware interface register 32 (abbreviated H/W I/F REG in FIG. 2), which is a general purpose 16 bit bi-directional register and has a sufficient number of entries for storing two types of interface information. The first type of information stored in hardware interface register 32 permits a handshaking between modem 20 and its host computer. This information includes two bits, one corresponding to the host computer and the other corresponding to modem 20. Each of these bits is set by the corresponding device either while or after it sends a command, and is reset by the receiving device once that device receives the command. For example, a first one of these bits may be set by the host computer when it issues a command to command/status register 30 and directed to modem 20, and then modem 20 will reset that same bit once it reads the sent command from command/status register 30. The second type of information stored in hardware interface register 32 indicates an approximate level of the quantity of data stored in FIFOs 26 and 28. In the preferred embodiment, these levels are set at full, empty, or half-full. Thus, this information may be obtained by either modem 20 or its host computer to coordinate the communication of DSL data between the two.

The ISA bus is further connected to an interrupt generator 34. In the preferred embodiment, interrupt generator 34 is operable to receive a control signal from modem 20 via the MBUS and in response to that signal to issue an interrupt to the host computer via the ISA bus. Note, however, that in an alternative embodiment interrupt generator 34 is operable to provide an interrupt in the opposing direction, that is, an interrupt may be commenced by the host computer writing a command to command/status register 30 to trigger an interrupt to modem 20 via the MBUS. Returning briefly to the preferred embodiment, an example of the use of interrupt generator 34 occurs in the receipt of DSL packet data by modem 20 from another modem. More particularly, when such packet data is received by modem 20, it writes an identifier to command/status register 30 as further discussed later, and it also issues a control signal to interrupt generator 34 which in turns presents an interrupt to the host computer via the ISA bus. At this juncture, therefore, and in response to the interrupt, the host computer reads the identifier in command/status register 30 to determine what caused the corresponding interrupt, and in the present case to determine that DSL packet data has arrived in modem 20.

As a final connection relating to the ISA bus, note that it provides an input to a multiplexer 36 (abbreviated "MUX" in FIG. 2) which has an output connected to the host port interface ("HPI") of the master DSP 22. This connection permits the host computer to write to the internal random access memory ("RAM") of master DSP 22 and, in this regard, the written information may include the executable code for operation of master DSP 22. While discussing multiplexer 36, note that it has a second input connected to the data output of slave DSP 24. Due to this connection, slave DSP 24 also may write to the internal RAM of master DSP 22 and, once again, the written information may include executable code for master DSP 22. Completing the discussion in this regard, note lastly that the data output of master DSP 22 is connected to the MBUS, and the MBUS is connected to the HPI of the slave DSP 24. Thus, as a final observation, master DSP 22 may write to the internal RAM of slave DSP 24, where that written information may include executable code for slave DSP 24.

Modem 20 further includes various circuitry related to operational timing. In this context, modem 20 includes a timing recovery and clock generator 38, a phase lock loop 40, and an oscillator 42. Accordingly, oscillator 42 provides a reference signal to phase lock loop 40, thereby providing a further control signal to tiring recovery and clock generator 38 which is a programmable clock generator integrated circuit. In response, timing recovery and clock generator 38 provides a first timing signal to the clock inputs of DSPs 22 and 24, and also provides reference signals (shown as the Sample Clock and the Symbol Clock) to a serial timing signal generator 44 associated with DSPs 22 and 24 and for use by other circuitry (not shown).

Concluding FIG. 2, modem 20 includes an analog front end ("AFE") 46. AFE 46 includes the necessary circuitry for communicating DSL frames between modem 20 and a conductor pair 48. From the context of FIG. 1, note that conductor pair 48 of FIG. 2 is representative of a part of the telephone company distribution system which therefore permits modem 20 to communicate with a compatible modem. Thus, if modem 20 of FIG. 2 is thought of as modem $M_{14}$ in FIG. 1, then conductor pair 48 permits modem 20 to communicate with modem $M_{12}$ in the telephone company central office. Looking to AFE 46 in more detail, note that DSPs 22 and 24 communicate DSL frames (either sending or receiving) through a buffered serial port (abbreviated on each DSP as BSP in FIG. 2). Thus, AFE 46 includes a serial-to-parallel converter 46a for converting serial information communicated from either DSP to a parallel format, and further includes a parallel-to-serial converter 46b for converting parallel information to serial information for presentation to the BSP in either DSP 22 or 24. Additionally, AFE 46 includes a digital-to-analog converter 46c for converting the parallel data from serial-to-parallel converter 46a to a form suitable for transmission to twisted pair 48, and further includes an analog-to-digital converter 46d for converting the data from twisted pair 48 to a form suitable to present to parallel-to-serial converter 46b. Although not shown, it should be understood that AFE 46 further includes a sufficient connector or hardware interface to connect twisted pair 48 to modem 20, where various types of such devices are ascertainable by one skilled in the art.

Given the hardware descriptions set forth above, reference is now turned to the formatting of the information communicated between modems $M_{12}$ and $M_{14}$, after which follows an explanation of the error correction of such formatted information according to the preferred embodiment. Particularly, under the preferred embodiment, each host computer 12 and 14 may communicate various types of information to its corresponding modem $M_{12}$ and $M_{14}$. In response to that information, the corresponding modem generally responds in at least one of two manners. As one response, the corresponding modem may issue a formatted command to the other modem where that command is based on the information received from the host computer. For more examples of this type of activity, the reader is invited to review U.S. patent application Ser. No. 09/001,125, entitled "Modem Host Interface In A Digital Subscriber Line Telecommunications System", having inventors Xioain Lu and Dennis Guy Mannering, filed Dec. 30, 1997, now abandoned, and which is hereby incorporated herein by reference. As another response, the corresponding modem may insert the information received from its corresponding host computer into a format and then transmit the formatted information to the other modem. In either case, for each modem in the preferred embodiment this formatting is accomplished via software and the one or more DSPs on the corresponding modem card. In addition, each modem also maintains flag registers to control the flow of communication of the formatted information between the modems to maintain proper communications, and to minimize conditions such as lock up of one or both modems. The details of the formatting and flow control are discussed in the above-referenced and incorporated U.S. patent application Ser. No. 09/001,125.

To commence an understanding of the error correction aspects detailed below, FIG. 3 illustrates the fundamental unit of information of communications between modems $M_{12}$ and $M_{14}$ and its relationship to other communicated information. Particularly, this fundamental unit of information is the frame. In FIG. 3, nine frames are shown with each having a designation "F" plus a subscript indicating its ordering in the sequence of frames (i.e. $F_1$ through $F_9$). The frame is described as the fundamental unit of communication because it is the base group or block of information communicated between modems $M_{12}$ and $M_{14}$, and thus various larger communications are made up of one or more frames. Each frame in the same direction of communication (i.e., either upstream or downstream) includes the same number of bits. However, the number of bits for downstream frames is contemplated as considerably higher than the number of bits for upstream frames. In addition, for either upstream or downstream frames, in the preferred embodiment the number of bits is a multiple of a fixed number (e.g., a multiple of 16 bits). The specific number of bits included in a frame in the preferred embodiment is determined based on the signal to noise ratio (SNR) of the line of communication between modems $M_{12}$ and $M_{14}$, but for purposes of the present embodiments the particular details of this determination need not be set forth. Instead, one skilled in the art should appreciate that the frame represents a fixed length unit for a given period and direction of communications, and since the other information units are composed of frames it should be appreciated that the frame boundaries also define the beginning and end of those other units. Additionally, by way of example, note that under MDSL technology as presently contemplated by DSL technology, a downstream frame includes a maximum of 44 words with each word being 16 bits (i.e., 704 bits), while an upstream frame includes a maximum of 12 words of 16 bits each (i.e., 192 bits). Lastly, DSL communications are synchronous communications; thus, once the physical layer is connected, under the preferred embodiment there is always a continuous stream of frames being communicated along the downstream path from modem $M_{12}$ to $M_{14}$, and also once the layer is connected there is likewise always a continuous stream of frames being communicated along the upstream path from modem $M_{14}$ to $M_{12}$. Consequently, when neither user nor system (e.g., control) data is being communicated, these frames are mere filler data. In any case, the continuous flow of frames provides a basis for timing in the synchronous system, and in the preferred embodiment are also used for error correction as detailed later.

Above the frames in FIG. 3 are shown a sequence of three messages, using the designation "MG" plus a subscript indicating an ordering in the sequence of messages (i.e. $MG_1$ through $MG_3$). At this point the illustration of FIG. 3 is intended to show the relative nature of frames as they combine to form messages. In FIG. 3, therefore, frames $F_1$ through $F_3$ are used to form message $MG_1$, frames $F_4$ through $F_6$ are used to form message $MG_2$, and frames $F_7$ through $F_9$ are used to form message $MG_3$. In the preferred embodiment, all messages start and end on a frame boundary, although some of the information at the end of a message may be mere "don't care" information to extend the length of the message so that it indeed ends on a frame boundary. In addition, the number of frames per message depends on the type of message, where such message types are detailed below. At this point, note by way of introduction that these message types include user messages, system messages, and filler messages. In the currently preferred embodiment, user messages are variable in length, that is, they consist of a variable number of frames where the maximum number of frames is limited by a byte length field described later; in contrast, system messages consist of a fixed number of frames with the number depending on the type of system message, and filler messages are also fixed in size such that each filler message is one frame in size. Lastly, recall that the frame size for downstream communications is considerably larger than the frame size for upstream communications. By the above definition relating frames to messages, therefore, the one message with three frames from modem $M_{12}$ to modem $M_{14}$ provides considerably more bits than the one message with three frames from modem $M_{14}$ to modem $M_{12}$. It is in this manner that the effective overall rate of bits communicated is larger for downstream communications as compared to upstream communications.

Having demonstrated the general format of messages and their relationship to frames, a discussion is now provided by way of context as to the use of messages to communicate various matters between modems $M_{12}$ and $M_{14}$. In general, recall from the previous introduction that there are three types of such uses and, thus, these types may be thought of as defining three types of corresponding messages. These three types of messages are filler messages, user messages, and system messages. Each of these messages is described below, after which follows a description further detailing how the type of message is specified within the format of the message.

Filler messages are named as such because they provide filler data between modems $M_{12}$ and $M_{14}$ as introduced earlier. Thus, during a time when neither user nor system messages are being communicated in a given direction between modems $M_{12}$ and $M_{14}$, then each message is a filler message communicated generally to maintain timing/message synchronization. As a result, when a modem receives a filler message and detects it to be such a message, it need not inform its host computer or otherwise remove any data from that message for communication onward to any software layer within that host computer. However, as detailed later, in the preferred embodiment the filler message is also used for error correction; thus, actions by the modem are taken in connection with filler messages for error correction, but preferably these actions are independent of and without disturbing the corresponding host computer.

User messages are named as such because each user message includes user data. For purposes of this document, user data may be best described by way of examples. For instance, when a user of computer 14 is reviewing e-mail received from computer 12, then the text of that message is user data. As another example, when a user of computer 14 is browsing the Internet from communications from computer 12, then the graphical interface (including text) is also user data. Stated simply, therefore, user data is typically data which is intended for meaningful presentation to the user, or is sent by the user to the Internet or some other recipient for presentation or some other common use of such information. Given this introduction to user data, note further that it is sometimes referred to as packet data. Thus, consistent with this terminology in the present embodiments, a "packet" or "data packet" is one or more frames of user data. For purposes of the present embodiments, user data is placed by the modem into a single message of a format described below with respect to FIG. 4. Thus, the host computer provides to the modem a number of bytes of user data, and the modem in turn formats this data into a message which includes the data as well as certain overhead information discussed below. As mentioned earlier, the length (i.e., number of frames or bytes) of a user message may vary.

System messages are generally those which are neither filler data nor user data as defined above. In this regard, the above-referenced and incorporated U.S. patent application Ser. No. 09/001,125 provides extensive detail regarding various examples of instances where a host computer issues a command to its corresponding modem, and the modem responds by sending what is referred to only as a "message" in the incorporated patent to the other modem to which it is connected. As one example from the incorporated patent, once a connection is established between modems, a host computer may issue a DropConnection command to its modem. The DropConnection command arises when an application program issues a request to end a connection to a modem driver, and the driver in response issues the DropConnection command to the corresponding modem. In response to the DropConnection command, the modem transmits a corresponding drop connection message to the other modem to which it is connected. This corresponding drop connection message is an example of a system message. Many others are in the incorporated U.S. patent application Ser. No. 09/001,125, and still others will be ascertainable by one skilled in the art.

FIG. 4 illustrates the preferred format for the user messages described above, and from this illustration the reader may further appreciate the preferred format for system and filler messages as further discussed later. Looking first then to FIG. 4, in general there are two categories of information in each user message, those being either overhead or data. Looking briefly to each, the message overhead includes two header words $HEADER_1$ and $HEADER_2$, as well as a checksum/CRC word $CC_1$. For purposes of the preferred embodiment, a word is defined as 16 bits; thus, each of these overhead quantities is preferably a 16 bit quantity. In the preferred embodiment, header words $HEADER_1$ and $HEADER_2$ are identical, that is, assuming proper operation and no errors then header word $HEADER_2$ is merely a repetition of header word $HEADER_1$. This allows the software receiving the message to verify the message control information. Particularly, when the message is received, a modem within the present inventive scope compares header words $HEADER_1$ and $HEADER_2$ with one another and deems an error in the message if the two header words do not match.

As further shown by an expanded view in FIG. 4, each of header words $HEADER_1$ and $HEADER_2$ includes three fields, consisting of a flow control flag ("FCF") field, a message type field, and a data byte length field. The FCF field need not be discussed herein but the reader desiring additional information is invited to review the above-incorporated U.S. patent application Ser. No. 09/001,055. The message type field is discussed below. The data byte length field (i.e., bits 10–0) specifies the number of valid data bytes included in the same message which provides the header; thus, recalling that the user message is variable in length, it is now noted that the data byte length field specifies the actual length of a given user message. In addition, since the present embodiment includes a length field having 11 bits, then the maximum number of bytes for a single user message is 2047 bytes (i.e., $(2^{11})-1=2047$). Note that some messages do not include any valid data. In this case, therefore, the data byte length field indicates zero valid data bytes.

Looking to checksum/CRC word $CC_1$, it provides standard checksum and/or cyclic redundancy code information as known in the art; thus this information may be used for error detection upon receipt of an entire message. Concluding with the message data in FIG. 4, it may be used to carry either user data or parameters associated with a system message.

The user message format of FIG. 4 may be simplified to appreciate the preferred embodiment for the preferred format for system and filler messages. Specifically, for a system message, no checksum/CRC word is provided and, thus, the message consists only of duplicate headers followed by one or more data words. For a filler message, only headers are communicated. Thus, the filler message consists only of the first header which is duplicated a second time in the same manner as for the system message, and which is also duplicated numerous additional times to form the filler message. Again, recall from above that the filler message in its entirety is preferably one frame long, thereby defining the number of times the header is duplicated to form the overall filler message. In the preferred embodiment, and as detailed below, these repeated headers of the filler message are monitored by a receiving modem to allow for an error correction functionality.

Returning now to the message type field (i.e., bits 14–11) of a header as shown in FIG. 4, it specifies, as its name indicates, the type of message which includes the header. Recall that message types were introduced earlier, and include filler messages, user messages, and system messages. Thus, a different code is provided by the message type field for each of these different types of messages. Additionally, in the preferred embodiment, note further that there are various different types of system messages. Accordingly, the message type field may further include different designations for these different types of system messages. To further illustrate the above, the following Table 1 sets forth various message types, and the message number encoded in the message type field to designate the corresponding message.

TABLE 1

| Message Number | Message |
| --- | --- |
| 0 | Packet Data |
| 1 | Not Defined |
| 2 | Request Connection Message |
| 3 | Not Defined |
| 4 | Answer Connection Message |
| 5 | Disconnect Message |
| 6 | Acknowledge Request Connection Message |
| 7 | Acknowledge Answer Connection Message |
| 8 | Acknowledge Disconnect Message |
| 9 | Filler Message |
| 10 | Adjust Sub-frame Message |
| 11–15 | Not Defined |

Given Table 1, note a few additional observations. First, since the message type field is preferably a four bit field, then it may encode up to 16 (i.e., $2^4=16$) different messages. Since Table 1 only illustrates nine messages, then therefore the remaining seven indicators are not defined and remain reserved for additional use. Second, message number 0 is a user message, message numbers 2 through 8 (excluding 1 and 3) are system messages further detailed in the above-incorporated U.S. patent application Ser. No. 09/001,125 (although some are slightly modified in more recent embodiments), and message number 9 is a filler message.

The focus of the remaining discussion is directed to messages 9 and 10 of Table 1. More specifically, recall it is stated earlier that in the preferred embodiment filler messages are monitored by a receiving modem to allow for an error correction functionality. In this regard, the message type for message number 9 indicates to the receiving modem that the received message is a filler message and, hence, that filler message may be analyzed for error detection as detailed below. In response to this monitoring activity, if a sufficient level of errors are detected as also detailed below, then message 10 (a system message) is communicated by the receiving modem back to the transmitting modem to adjust for this level of error detection. All of these aspects are further explored below.

Figure 5:
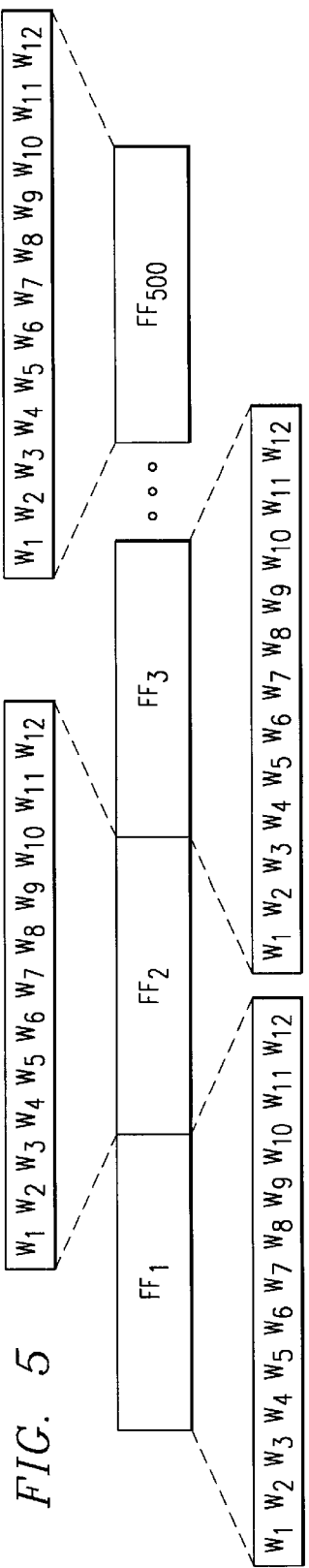
FIG. 5 illustrates a sequence of filler frame messages, and further depicts how each frame includes a group of words.

By way of additional introduction to the functionality of detecting receipt of erroneous data and responding to that data, FIG. 5 illustrates a series of 500 filler messages, where each message is communicated by a corresponding frame. Accordingly, the 500 filler messages correspond to a series of 500 frames, shown in FIG. 5 as filler frames $FF_1$ through $FF_{500}$. Additionally and as demonstrated below, in the preferred embodiment error analysis and correction is achieved on a word basis, that is, in response to each word within a frame. To further demonstrate this aspect later, therefore, each frame in FIG. 5 is further shown as having numerically ordered word locations within the frame. In this regard, recall it is stated earlier that an upstream frame includes 12 words (of 16 bits each). Thus, assuming that the example of FIG. 5 is for upstream communications (i.e., from modem $M_{14}$ to modem $M_{12}$), then each of frames $FF_1$ through $FF_{500}$ is illustrated in exploded view as including 12 words, where those words are hereafter referred to as words $W_1$ through $W_{12}$ with the subscript indicating the relative position of the word within the frame. Lastly, recall that messages are communicated bi-directionally between modems under the preferred embodiment; thus, a given modem operates as either a receiving modem or a transmitting modem depending on a particular instance of a communication. Accordingly, each modem provides the error correction functionality described below with respect to filler frames it receives from the other modem. For sake of simplifying the discussion, however, modem $M_{12}$ is described by way of example insofar as it detects errors received in upstream communications from modem $M_{14}$ and responds accordingly, while one skilled in the art should appreciate that a comparable functionality also preferably occurs for modem $M_{14}$ with respect to erroneous filler frames it receives in downstream communications from modem $M_{12}$.

Figure 6:
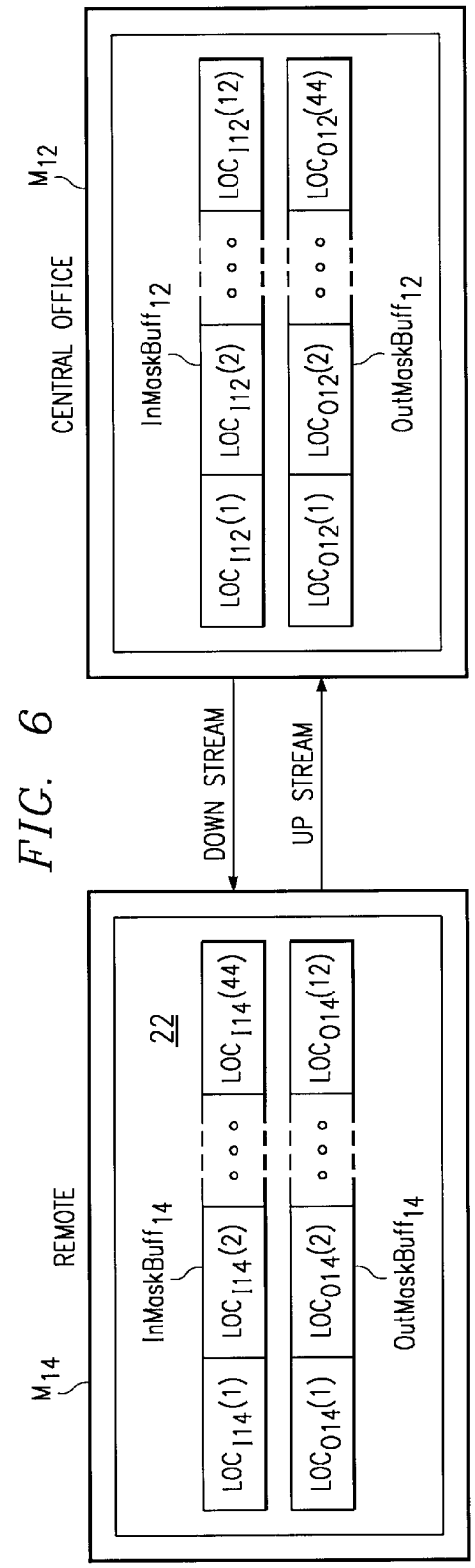
FIG. 6 illustrates the inclusion of an InMaskBuff and OutMaskBuff buffer, preferably located in the memory space of a DSP.

In the preferred embodiment, detection and response to errors in the words of the filler frames are achieved through the use of two error correction buffers in each modem, referred to in this document as InMaskBuff and OutMaskBuff. In this regard, FIG. 6 illustrates a simplified block diagram of modems $M_{12}$ and $M_{14}$ from FIG. 1, with the emphasis on these buffers. More specifically, modem $M_{12}$ includes these buffers designated as $InMaskBuff_{12}$ and $OutMaskBuff_{12}$ and modem $M_{14}$ includes these buffers designated as $InMaskBuff_{14}$ and $OutMaskBuff_{14}$. For reasons more clear below, each InMaskBuff buffer operates in conjunction with the OutMaskBuff buffer of the opposing modem, and also for this reason has the same number of storage locations as the opposing modem's buffer. Thus, $InMaskBuff_{12}$ operates in conjunction with $OutMaskBuff_{14}$, and both have 12 locations. Similarly, $InMaskBuff_{14}$ operates in conjunction with $OutMaskBuff_{12}$, and both have 44 locations. In the preferred embodiment, these buffers for each modem are storage space allocated within the memory space of master DSP 22 and, thus, are shown generally within a block identified at 22 in FIG. 6; however, in an alternative embodiment, the functionality provided by these buffers may be implemented in other storage manners as ascertainable by one skilled in the art.

By way of further introduction to the InMaskBuff buffers, note that the buffers are directed to monitoring word locations to determine whether any one or more of those locations includes erroneous bits, and responding if the frequency of such erroneous bits is deemed to be sufficient to warrant some type of corrective action. In this regard and more specifically, each of the buffers operating in conjunction with one another includes at least N storage locations, where N equals the number of words per frame that are being processed for a given direction of communication. Thus, for the example of upstream communications shown in FIG. 5, recall that N equals 12; moreover, in FIG. 6, each of $InMaskBuff_{12}$ and $OutMaskBuff_{14}$, are directed to upstream communications as appreciated later and, therefore, there buffers both include 12 storage locations, corresponding to each of the 12 word locations within an upstream frame. For purposes of convention for the rest of this document, the locations are referred to in the convention of $LOC_{I12}(X)$ for a location X in $InMaskBuff_{12}$, and in the convention of $LOC_{O14}(Y)$ for a location Y in $OutMaskBuff_{14}$. For an example in the upstream direction, $LOC_{I12}(3)$ is the location in $InMaskBuff_{12}$ corresponding to a received word $W_3$ in a given upstream filler frame. As an example in the downstream direction, although not detailed heavily below, $LOC_{I14}(23)$ is the location in $InMaskBuff_{14}$ corresponding to received word $W_{23}$ in a given downstream filler frame. more of those locations includes erroneous bits, and responding if the frequency of such erroneous bits is deemed to be sufficient to warrant some type of corrective action. In this regard and more specifically, each of the buffers operating in conjunction with one another includes at least N storage locations, where N equals the number of words per frame that are being processed for a given direction of communication. Thus, for the example of upstream communications shown in FIG. 5, recall that N equals 12; moreover, in FIG. 6, each of $InMaskBuff_{12}$ and $OutMaskBuff_{14}$, are directed to upstream communications as appreciated later and, therefore, these buffers both include 12 storage locations, corresponding to each of the 12 word locations within an upstream frame. For purposes of convention for the rest of this document, the locations are referred to in the convention of $LOC_{I12}(X)$ for a location X in $InMaskBuff_{12}$, and in the convention of $LOC_{O14}(Y)$ for a location Y in $OutMaskBuff_{14}$. For an example in the upstream direction, $LOC_{I12}(3)$ is the location in $InMaskBuff_{12}$ corresponding to a received word $W_3$ in a given upstream filler frame. As an example in the downstream direction, although not detailed heavily below, $LOC_{I14}(23)$ is the location in $InMaskBuff_{14}$ corresponding to received word $W_{23}$ in a given downstream filler frame.

A detailed presentation is set forth below in FIGS. 7 and 8 regarding the use of InMaskBuff to detect errors and communicate to the sending modem in response thereto. By way of introduction at this point, however, note in the preferred embodiment that a preferred methodology is provided so that the InMaskBuff and OutMaskBuff buffers operating in conjunction (while in opposing modems) are used to identify relative accuracy of information in word locations within received filler frames, and to respond appropriately based on that accuracy. More particularly, when a particular word location over time is determined to contain erroneous information by a given InMaskBuff, that word location is then suppressed by the OutMaskBuff working in conjunction with it so that the problematic word location is not thereafter used to communicate either user or system message information between the modems. During this period of suppression, however, the word location still communicates filler information and that filler information is monitored to determine if the error frequency for the location eventually reduces. If errors are in fact reduced to an acceptable level, then the suppressed status is revoked, thereby once again permitting the word location to communicate any of user, system, or filler information between the modems. Concluding this introduction to the preferred embodiment, note lastly the described method is preferably implemented by software (or firmware) code executed by DSP 22 on a given modem, and from this document such code should be readily ascertainable by one skilled in the art.

By way of further introduction to the preferred error elimination methodology, note in the preferred embodiment that for a given modem the indication of its InMaskBuff serves two purposes. First, InMaskBuff maintains an evaluation of the recent occurrence of errors according to word location. Second, InMaskBuff indicates to a receiving modem whether that modem should ignore incoming word locations (for either system or user information) because an earlier determination has been made that the location has tended to carry an unacceptably large amount of erroneous information. More specifically, the numeric value stored each location within InMaskBuff presents information to achieve these two functions. In the preferred embodiment, a stored value less than zero (i.e., a negative value) indicates that during the recent past a filler message was received and the word in that message, which corresponds to the location storing the negative value included at least one erroneous bit. Additionally, a stored value equal to one indicates that, for reasons detailed below, after the most recently received filler message the word location corresponding to the stored value of one has been designated as a location which is suppressed from communicating either system or user information between the modems. For example, if location $LOC_{I12}(5)$ in modem $M_{12}$ equals one, then the sending modem $M_{14}$ is configured not to send valid information within word $W_5$ of a frame and the receiving modem $M_{12}$ is similarly configured not to anticipate that the information of word $W_5$ represents valid information. Lastly, any stored value which is non-negative and greater than one indicates that for successively received filler messages the word location corresponding to the stored value has been error-free, yet before receipt of those successively received filler messages the word location had contained erroneous information. All of the above-introduced aspects are further appreciated from the following discussion.

FIGS. 7 and 8 illustrate flowcharts of the preferred methods 50 and 72 for a modem receiving filler messages and detecting errors in those messages. As stated above, each modem in accordance with the preferred embodiment includes a set of InMaskBuff and OutMaskBuff buffers and, thus, method 50 applies equally to modems $M_{12}$ and $M_{14}$ of FIG. 1. However, to facilitate an understanding of FIGS. 7 and 8, the following discussion is directed to modem $M_{12}$ in the case where it is operating to receive filler messages from modem $M_{14}$. Naturally, therefore, one skilled in the art should appreciate that the same concepts apply to the opposite scenario where modem $M_{14}$ is receiving filler messages from modem $M_{12}$.

Method 50 commences with steps 52 and 54 which represent two initialization operations. Step 52 represents the values stored in $InMaskBuff_{12}$ of modem $M_{12}$ after initialization. Particularly, after initialization, each of the locations $LOC_{I12}(1)$ through $LOC_{I12}(12)$ are initialized to a value of zero. In FIG. 7, this is illustrated in step 52 by the convention of $[LOC_{I12}(1):LOC_{I12}(12)]=[0:0]$. Next, method 50 continues from step 52 to 54. Step 54 initializes a counter value in modem $M_{12}$ identified as FRAMES_RCVD to a value of zero. As appreciated below, FRAMES_RCVD counts the number of frames between successive evaluations of the errors received in those frames. After these initialization steps, method 50 continues to step 56.

Step 56 represents the receipt by modem $M_{12}$ of a filler message frame. In this regard, it should be appreciated that modem $M_{12}$ actually may receive any one of the three message types introduced above (i.e., user, system, filler). Method 50, however, is directed to the evaluation of errors as received in filler messages and, thus, step 56 occurs only when a filler message is received. If either a user or system message is received, modem $M_{12}$ may respond in any of various manners which do not necessarily pertain to the presently described embodiments, such as those discussed in the above-cited and incorporated patent applications. If a filler message frame is received, such as any of frames $FF_1$ through $FF_{500}$ of FIG. 5, then method 50 continues to step 58.

In step 58, modem $M_{12}$ determines whether the received filler message frame contains any erroneous bits. In this regard, note that modem $M_{12}$ is earlier configured, such as during a training or initialization procedure, of the bit values to expect in each of the repeated frames of a filler message (i.e., in each of the repeated headers of the filler message). Given this information, modem $M_{12}$ performs step 58 by comparing these known bit values to the bit values of the received filler message frame. This bitwise comparison therefore will result in an indication of whether there is a mismatch in any bit or bits in the received message frame; to the extent that such a mismatch occurs, then the corresponding received bits are deemed erroneous. In the context of the present embodiments, therefore, by the conclusion of step 58 modem $M_{12}$ has determined which words in the received frame are error-free and which words in the received frame are erroneous. Next, method 50 continues from step 58 to step 60.

In step 60 modem $M_{12}$ creates a record of the words in the received frame which include one or more erroneous bits. More particularly in the preferred embodiment, for such words the corresponding location in InMaskBuff$_{12}$ is adjusted to indicate receipt of the erroneous word. In still greater detail, for each word having an error, and if the word location is one which has not been suppressed from use between the modems as detailed below, the corresponding location in InMaskBuff$_{12}$ is decremented. These responses may be appreciated further by way of an example. Assume, therefore, the following three conditions: (1) that modem $M_{12}$ in step 56 receives frame $FF_1$ of FIG. 5; (2) that words $W_2$ and $W_8$ each include one or more erroneous bits; and (3) that at least word locations $W_2$ and $W_8$ are not currently suppressed from use for system or user information between the modems. In response, step 60 decrements the value in $LOC_{f12}(2)$ and $LOC_{f12}(8)$. Accordingly, if this is the first received filler frame after the initialization of step 52, then after step 60 each of the values of $LOC_{f12}(2)$ and $LOC_{f12}(8)$ now equal −1. Next, method 50 continues to step 62.

In step 62 modem $M_{12}$ creates a record for any word location which earlier had errors but is now determined to be error-free; in other words, the goal of step 62 as it repeats over time is to detect those word locations which at one time had erroneous bits but through repeated receipt of subsequent frames have been determined to be error-free. More specifically in the preferred embodiment, the record is created for words which meet the following three criteria: (1) the word location has no erroneous bits; (2) the word location is one which earlier has been suppressed from communicating system or user information between the modems; and (3) either the current frame is the first frame received after the word location was suppressed from communicating system or user information between the modems, or the same word location was error-free for both the current frame and the frame received immediately before the current. In the preferred embodiment, this step is achieved by modem $M_{12}$ incrementing the corresponding location in InMaskBuff$_{12}$. The criteria also may be appreciated further by way of an example. Assume, therefore, the following three conditions: (1) that modem $M_{12}$ in step 56 receives frame $FF_5$ of FIG. 5 and that frame includes no erroneous bits; (2) that since the processing of frame $FF_1$, word location $W_3$ has been suppressed from communicating user or system information between the modems; and (3) that word location $W_3$ in each of frames $F_2$, $F_3$, $F_4$, and $F_5$. Under these circumstances, note therefore that word location $W_3$ has been consecutively accurate since the receipt of frame $F_2$. Accordingly, in step 62 modem $M_{12}$ creates its record by incrementing the corresponding location in InMaskBuff$_{12}$; in the present example of word $W_3$, therefore, location $LOC_{f12}(3)$ is incremented.

In step 64 modem $M_{12}$ responds to any word location in the received filler frame which corresponds to a word location that is currently suppressed from communicating user or system information between the modems and which includes one or more erroneous bits. In the preferred embodiment, this step is achieved by modem $M_{12}$ setting the corresponding location in InMaskBuff$_{12}$ to a value of 1. For example, if word $W_4$ is currently suppressed from communicating either system or user information between modems $M_{12}$ and $M_{14}$, and modem $M_{12}$ receives a frame wherein word $W_4$ contains one or more erroneous bits, then the location $LOC_{f12}(4)$ is set to 1. Next, method 50 continues from step 64 to step 66.

Before proceeding, it is now instructive to contrast the methodologies of steps 62 and 64. Particularly, as will be apparent by the conclusion of the FIG. 7 discussion, either or both of steps 62 and 64 may occur several times for a given sequence of received frames. Moreover, both of steps 62 and 64 apply to word locations which are currently suppressed from use for either user or system information between the modems. Thus, for such a word location, if it is received consistently as error-free then step 62 continues to increase the corresponding count in InMaskBuff. However, if during the successive receipt of frames there is an interruption in the accuracy of a given word location, then step 64 serves to effectively reset the corresponding count in InMaskBuff to a value of 1. Accordingly, a relatively high count in InMaskBuff is only achieved so long as the word location at issue is error-free in a relatively large number of consecutively received frames. These contrasting results provide further bases for additional actions to be taken as detailed later.

In step 66 modem $M_{12}$ increments the FRAMES_RCVD count which was introduced and initialized in step 54. As appreciated below, this incrementing operation is directed to repeating method 50 for a number of received frames, where that number is governed through a comparison of FRAMES_RCVD to a threshold THR1 in step 68. Specifically, in step 68, modem $M_{12}$ compares the value of FRAMES_RCVD to THR1. In a sample embodiment, the value of THR1 equals 500. In this example, therefore, step 68 determines whether FRAMES_RCVD is greater than or equal to 500; of course, the comparison could be through other criteria, such as greater than rather than greater than or equal to. In any event, if FRAMES_RCVD is less than THR1, then method 50 returns to step 56 to receive the next filler message frame. In this instance, therefore, one skilled in the art will appreciate that this return method flow continues until a total of 500 filler frames are received and processed by method 50. Accordingly, during this repetition for 500 filler frames, the words of each frame are evaluated to determine whether they include errors, and the locations of InMaskBuff are adjusted accordingly. Once 500 frames are received, the value of FRAMES_RCVD also equals 500 and, therefore, when step 68 is reached, method 50 continues to step 70. Step 70 begins a method 72 for processing the values of InMaskBuff (e.g., InMaskBuff$_{12}$), and for sake of simplifying the illustration of FIG. 7 this method is detailed in FIG. 8 discussed below.

By way of introduction, method 72 responds to the information accrued from the bit analyses of the word locations of method 50 to cause either: (1) a word location to be suppressed from communicating either system or user messages between the modems; or (2) to restore a word location into use between modems where that word location was earlier suppressed from use. In the preferred embodiment, a single pass through the steps of method 72 performs at most only one of these two alternative actions; in an alternative embodiment, however, both actions could be taken with respect to one or more corresponding word locations. The specifics of these actions are discussed immediately below.

Method 72 begins with step 74, where modem $M_{12}$ identifies the entry in its InMaskBuff$_{12}$ having the highest absolute value. From the above discussion of FIG. 7 it should be appreciated that InMaskBuff$_{12}$ is likely to include locations storing a value equal to 0, locations storing negative numbers (i.e., corresponding to word locations having errors), and locations storing positive numbers (i.e., for a value greater than 1 corresponding to word locations that earlier had errors and now were received error-free on a consecutive basis, or for a value equal to 1 corresponding to a word location that earlier had errors and continues to have errors). From these InMaskBuff locations, step 74 identifies the one having the highest absolute value. For the sake of discussion, this location is hereafter referred to as location LOC$_{f12}$(MAX) (and is shown as such in FIG. 8). Next, method 72 continues to step 76.

In step 76, modem M$_{12}$ determines whether the absolute value stored in LOC$_{f12}$(MAX) exceeds a threshold designated THR2. In a sample embodiment, the value of THR2 equals 50. If the absolute value stored in LOC$_{f12}$(MAX) is less than or equal to THR2, then method 72 continues to step 78 which returns the flow to step 54 of method 50 (i.e., see FIG. 7); on the other hand, if the absolute value stored in LOC$_{f12}$(MAX) exceeds THR2, then method 72 continues to step 80.

Step 80 directs method 72 to a next step based on the sign of the value stored in LOC$_{f12}$(MAX). Recall that a negative sign suggests a corresponding word location having a high frequency of errors, while a positive sign suggests a corresponding word location which formerly was erroneous but more recently was received in successive error-free frames. Given these considerations and for reasons more apparent below, step 80 directs the flow to step 82 if the sign of the value stored in LOC$_{f12}$(MAX) is negative and to step 84 is the value stored in LOC$_{f12}$(MAX) is positive. Each of these alternative paths is discussed below.

In step 82, having been reached due to the processing of a word location having a relatively large number of errors, modem M$_{12}$ sends an adjust sub-frame system message to the sending modem (e.g., M$_{14}$) to suppress future transmissions of user or system messages at word location LOC$_{f12}$(MAX). In this regard, recall from Table 1 that the adjust sub-frame message will include a message type indicator (i.e., a value of 10) which indicates to modem M$_{14}$ that the message is directing modem M$_{14}$ to adjust the sub-frame. Moreover, the adjust sub-frame message includes an identifier of the word location at issue. The function of the adjust sub-frame message, and hence the basis for its name, is that it is a request of modem M$_{14}$ to make an adjustment to a portion of the frame (i.e., a word or "sub-frame") so that portion is "adjusted" in a manner for subsequent communications. In the instance of step 82, the particular adjustment requested, as further evidenced by a setting in the message, is that the identified word location not be used thereafter to communicate valid information in either a user or system message. Under typical operations, in the preferred embodiment it is therefore anticipated that the sending modem M$_{14}$ will set a flag in a corresponding location of its OutMaskBuff$_{14}$ so that, until that flag is later reset, modem M$_{14}$ will not use the subject word location to send valid bits for either user or system messages. It is in this manner, therefore, that InMaskBuff$_{12}$ of modem M$_{12}$ operates in conjunction with OutMaskBuff$_{14}$ of the opposing modem M$_{14}$. Again and although not detailed to simplify the present explanation, it should be appreciated by one skilled in the art that a comparable operation also occurs between InMaskBuff$_{14}$ of modem M$_{14}$ and OutMaskBuff$_{12}$ of modem M$_{12}$. Returning now to the present example, once this flag is set by modem M$_{14}$, it sends an acknowledgment back to the modem (e.g., M$_{12}$) which issued the adjust sub-frame message. Once modem M$_{12}$ sends the adjust sub-frame message in step 82, method 72 continues to step 86, which is detailed after the following discussion of the alternative to step 82, namely, step 84.

In step 84, having been reached due to the processing of a word location having a relatively large number of successive error-free occurrences following an earlier suppression of that location, modem M$_{12}$ sends an adjust subframe message to the sending modem (e.g., M$_{14}$); in this case, however, an indicator in the adjust sub-frame message causes the message to form a request to enable future transmissions at word location LOC$_{f12}$(MAX). Here under typical operations, in the preferred embodiment it is anticipated that the sending modem M$_{14}$ will reset a flag in a corresponding location of its OutMaskBuff$_{14}$ so that, until that flag is later set, modem M$_{14}$ is able to use the subject word location to send valid bits for any of filler, user, or system messages. Moreover, once this flag is reset by modem M$_{14}$, it sends an acknowledgment back to the modem (e.g., M$_{12}$) which issued the adjust sub-frame message. As in the case of step 82, for step 84 once modem M$_{12}$ sends the adjust subframe message, method 72 continues to step 86 detailed immediately below.

In step 86, modem M$_{12}$, having sent an adjust sub-frame message, awaits the first of two events. The first event is receipt of the acknowledgment from modem M$_{14}$, where the acknowledgment may occur from either of steps 82 or 84 discussed above. In the preferred embodiment, however, it is contemplated that for some reason the acknowledgment may not arrive in an acceptable amount of time. Given this contingency, a second event which may alternatively trigger further action in step 86 is the end of a timeout period, where the duration of that period may be selected by one skilled in the art (e.g., the time required to receive another 500 filler messages frames). If the timeout occurs, in which case no acknowledgment has been received by modem M$_{12}$, then method 72 continues to step 78 which, recall, returns the flow to step 54 of FIG. 7. On the other hand, if the acknowledgment is received, then modem M$_{12}$ is thereby informed that modem M$_{14}$ has properly configured its OutMaskBuff$_{14}$ to either enable or suppress future transmissions using the word location identified by the adjust-subframe message. In this case, method 72 continues to step 88.

Step 88 directs flow based on the same criterion as step 80, that is, based on the sign of the number corresponding to LOC$_{f12}$(MAX). Specifically, step 88 directs the flow to step 90 if the sign of the value stored in LOC$_{f12}$(MAX) is negative and to step 92 is the value stored in LOC$_{f12}$(MAX) is positive. Each of these alternative paths is discussed below.

In step 90, having been reached after an acknowledgment of suppressing a word location due to a relatively large negative number in LOC$_{f12}$(MAX), modem M$_{12}$ sets the value at location LOC$_{f12}$(MAX) to 1. Recall from earlier, therefore, that for the next set of 500 frames the value of 1 will increment if the word is successively received without errors, or will be returned to a value of 1 if a successively received word at the same location contains errors. Thereafter, method 72 continues to step 78 which, as stated above, returns the flow to step 54 of FIG. 7.

In step 92, having been reached after an acknowledgment of enabling a word location due to a relatively large positive number in LOC$_{f12}$(MAX), modem M$_{12}$ sets the value at location LOC$_{f12}$(MAX) to 0. Recall from earlier, therefore, that for the next set of 500 frames the value of 0 will decrement if the word is received with errors, and after the next set is complete this word location may be suppressed if its absolute value is larger than any other value then existing in InMaskBuff$_{12}$. Thereafter, method 72 continues to step 78 which, as stated above, returns the flow to step 54 of FIG. 7.

Having concluded a discussion of FIG. 8, one skilled in the art should now appreciate the preferred methodology for a modem analyzing its InMaskBuff and responding to its indication of either high or low incidences of sub-frame errors. Relatively high occurrences of errors are treated by suppressing the corresponding sub-frame until such time as the same sub-frame is found to be error free over a sufficient number of successive frames. In addition, while the embodiment of FIG. 8 provides only a single treatment at a time for the highest absolute value in InMaskBuff, it should be noted that alternative embodiments may be derived from the current teachings in response to the measures of errors in InMaskBuff. For example, rather than only responding to the highest absolute value of InMaskBuff, two sets of analyses could be taken with respect to InMaskBuff, where one is directed to the largest magnitude positive number (i.e., the most error laden) while the other is directed to the largest magnitude negative number (i.e., the least error laden). Still other approaches may be ascertained by one skilled in the art.

From the above, it may be appreciated that the above embodiments provide an improved telecommunications systems including circuits, systems, and methods for error elimination in a digital subscriber line modem. For example, the error elimination preferred embodiment provides various flexibility, and may be used in different DSL systems. Additionally, the software and DSP implementation reduces complexity, thereby reducing cost and providing a more viable system for wide-scale use and dissemination. As still another benefit, while the preceding discussion illustrates the preferred embodiment and various alternative embodiments in detail, various substitutions, modifications or alterations could be made to the descriptions set forth above without departing from the inventive scope. Indeed, the various alternatives set forth above should demonstrate to one skilled in the art that further flexibility is contemplated. Moreover, as yet another example of an alternative, note that the notion of frames is readily appreciated by one skilled in the art in the context of DSL systems implementing DMT. As a final example, while various flow charts have demonstrated a certain order of steps, in various instances these steps may be combined, re-arranged, or otherwise modified while still providing an overall error correction functionality. Thus, these as well as other examples ascertainable by one skilled in the art should be considered within the inventive scope, as defined by the following claims.

What is claimed is:

1. A method of communicating bit groups between a first DSL modem and a second DSL modem, comprising the steps of:

receiving at the first DSL modem a plurality of bit groups from the second DSL modem, wherein each of the plurality of bit groups comprises a plurality of bit sub-groups and each of the plurality of bit sub-groups has an order of location within its respective bit group;

for each of the plurality of bit groups, determining whether bits of a plurality of bit sub-groups having a corresponding order of location in their respective bit groups comprise at least one erroneous bit; and responsive to the determining step, storing in the first DSL modem a record of whether the plurality of bit sub-groups having the corresponding order of location comprises at least one erroneous bit.

2. The method of claim 1:

wherein the plurality of bit groups communicated between the first and second DSL modems are communicated using DMT communications; and wherein each of the plurality of bit groups comprises DMT frames.

3. The method of claim 1:

wherein the step of determining whether bits of the plurality of bit sub-groups having a corresponding order of location in their respective bit groups comprise at least one erroneous bit comprises determining whether the bits of the plurality of bit sub-groups having the corresponding order of location in their respective bit groups match a predetermined pattern;

and wherein the storing step comprises storing in the first DSL modem a record of whether the plurality of bit sub-groups having the corresponding order of location in their respective bit groups matches the predetermined pattern.

4. The method of claim 3 and further comprising:

receiving at the second DSL modem a plurality of bit groups from the first DSL modem, wherein each of the plurality of bit groups from the first DSL modem comprises a plurality of bit sub-groups and each of the plurality of bit sub-groups from the first DSL modem has an order of location within its respective bit group;

for each of the plurality of bit groups from the first DSL modem, determining whether bits of the plurality of bit sub-groups having a corresponding order of location in their respective bit groups match a predetermined pattern; and responsive to the determining step for the plurality of bit groups from the first DSL modem, storing in the second DSL modem a record of whether the plurality of bit sub-groups having the corresponding order of location in their respective bit groups matches the predetermined pattern.

5. The method of claim 1 and further comprising:

receiving at the second DSL modem a plurality of bit groups from the first DSL modem, wherein each of the plurality of bit groups from the first DSL modem comprises a plurality of bit sub-groups and each of the plurality of bit sub-groups from the first DSL modem has an order of location within its respective bit group;

for each of the plurality of bit groups from the first DSL modem, determining whether bits of a plurality of bit sub-groups having a corresponding order of location in their respective bit groups comprise one or more erroneous bits; and responsive to the determining step for the plurality of bit groups from the first DSL modem, storing in the second DSL modem a record of whether the plurality of bit sub-groups having the corresponding order of location in their respective bit groups comprises one or more erroneous bits.

6. A method of communicating bit groups between a first DSL modem and a second DSL modem, comprising the steps of:

receiving at the first DSL modem a plurality of bit groups from the second DSL modem, wherein each of the plurality of bit groups comprises a plurality of bit sub-groups and each of the plurality of bit sub-groups has an order of location within its respective bit group;

for each of the plurality of bit groups, determining whether bits of a plurality of bit sub-groups having a corresponding order of location in their respective bit groups comprise at least one erroneous bit; and responsive to the determining step, storing in the first DSL modem a record of whether the plurality of bit sub-groups having the corresponding order of location in their respective bit groups comprises at least one erroneous bit;

wherein the step of determining whether bits of the plurality of bit sub-groups having a corresponding order of location in their respective bit groups comprise at least one erroneous bit comprises determining whether the bits of the plurality of bit sub-groups having the corresponding order of location in their respective bit groups match a predetermined pattern;

and wherein the storing step comprises storing in the first DSL modem a record indicating a number of mismatches between the plurality of bit sub-groups having the corresponding order of location in their respective bit groups and the predetermined pattern;

and further comprising, responsive to the record indicating a number of mismatches between the plurality of bit sub-groups having the corresponding order of location in their respective bit groups and the predetermined pattern, suppressing the plurality of bit sub-groups from communicating valid information from the second DSL modem to the first DSL modem.

7. The method of claim 6 wherein the step of suppressing comprises suppressing the plurality of bit sub-groups from communicating valid system information from the second DSL modem to the first DSL modem.

8. The method of claim 6 wherein the step of suppressing comprises suppressing the plurality of bit sub-groups from communicating valid user information from the second DSL modem to the first DSL modem.

9. The method of claim 6 wherein the step of suppressing comprises suppressing the plurality of bit sub-groups from communicating either valid user information or valid system information from the second DSL modem to the first DSL modem.

10. The method of claim 6 wherein the suppressing step does not affect communication of filler information from the second DSL modem to the first DSL modem.

11. The method of claim 6 wherein the suppressing step comprises:

issuing a suppression request from the first DSL modem to the second DSL modem;

issuing an acknowledgment of the suppression request from the second DSL modem to the first DSL modem; and completing the step of suppressing the plurality of bit sub-groups from communicating valid information from the second DSL modem to the first DSL modem in response to the first DSL modem receiving the acknowledgment.

12. The method of claim 11 wherein the completing step is not achieved if the acknowledgment is not received by the first DSL modem within a timeout period.

13. A method of communicating bit groups between a first DSL modem and a second DSL modem, comprising the steps of:

receiving at the first DSL modem a plurality of bit groups from the second DSL modem, wherein each of the plurality of bit groups comprises a plurality of bit sub-groups and each of the plurality of bit sub-groups has an order of location within its respective bit group;

for each of the plurality of bit groups, determining whether bits of a plurality of bit sub-groups having a corresponding order of location in their respective bit groups comprise at least one erroneous bit; and responsive to the determining step, storing in the first DSL modem a record of whether the plurality of bit sub-groups having the corresponding order of location in their respective bit groups comprises at least one erroneous bit;

wherein the step of determining whether bits of plurality of bit sub-groups having a corresponding order of location in their respective bit groups comprise at least one erroneous bit comprises determining whether the bits of the plurality of bit sub-groups having the corresponding order of location in their respective bit groups match a predetermined pattern;

wherein the storing step comprises storing in the first DSL modem a record indicating a number of mis-matches between the plurality of bit sub-groups having the corresponding order of location in their respective bit groups and the predetermined pattern;

wherein the first DSL modem comprises a storage circuit having a location corresponding to the corresponding order of location in the respective bit groups; and wherein the step of storing in the first DSL modem the record indicating a number of mis-matches between the plurality of bit sub-groups having the corresponding order of location and the predetermined pattern comprises advancing in a first direction a count in the corresponding order of location of the storage circuit in response to a mis-match between the plurality of bit sub-groups having the corresponding order of location in their respective bit groups and the predetermined pattern.

14. The method of claim 13 wherein the step of storing in the first DSL modem the record of whether the plurality of bit sub-groups having the corresponding order of location in their respective bit groups matches the predetermined pattern comprises advancing in a second direction the count in the corresponding order of location in the respective bit groups of the storage circuit in response to consecutive matches between the plurality of bit sub-groups and the predetermined pattern.

15. The method of claim 14 and further comprising the step of setting the count to an initial value prior to the step of advancing the count in the second direction.

16. The method of claim 15 wherein the setting step is responsive to an earlier step of suppressing the plurality of bit sub-groups from communicating valid information from the second DSL modem to the first DSL modem.

17. The method of claim 15 wherein the setting step is responsive to:

first an earlier step of suppressing the plurality of bit sub-groups from communicating valid information from the second DSL modem to the first DSL modem; and second an earlier step of determining that bits of plurality of bit sub-groups having the corresponding order of location in their respective bit groups in a first instance matched the predetermined pattern and in a second instance did not match the predetermined pattern.

18. The method of claim 15:

wherein the initial value is a positive number; and wherein the step of advancing in the first direction comprises advancing the count to a value which is a negative number; and wherein the step of advancing in the second direction comprises advancing the count to a value which is a positive number.

19. The method of claim 18 and further comprising:

identifying the location in the storage circuit having a largest absolute value;

responsive to a negative number being stored in the location in the storage circuit having the largest absolute value and the absolute value exceeding a threshold, suppressing the at least one sub-group from communicating valid information from the second DSL modem to the first DSL modem; and responsive to a positive number being stored in the location in the storage circuit having the largest absolute value and the absolute value exceeding a threshold, enabling the plurality of bit sub-groups to communicate valid information from the second DSL modem to the first DSL modem.

20. A method of communicating bit groups between a first DSL modem and a second DSL modem, comprising the steps of:

receiving at the first DSL modem a plurality of bit groups from the second DSL modem, wherein each of the plurality of bit groups comprises a plurality of bit sub-groups and each of the plurality of bit sub-groups has an order of location within its respective bit group;

for each of the plurality of bit groups, determining whether bits of a plurality of bit sub-groups having a corresponding order of location comprise at least one erroneous bit; and responsive to the determining step, storing in the first DSL modem a record of whether the plurality of sub-groups having the corresponding order of location in their respective bit groups comprises at least one erroneous bit;

wherein the step of determining whether bits of plurality of bit sub-groups having a corresponding order of location in their respective bit groups comprise at least one erroneous bit comprises determining whether the bits of the plurality of bit sub-groups having the corresponding order of location in their respective bit groups match a predetermined pattern;

and wherein the storing step comprises storing in the first DSL modem a record indicating a number of matches and a number of mismatches between the plurality of bit sub-groups having the corresponding order of location in their respective bit groups and the predetermined pattern;

and further comprising:

first, responsive to the record indicating a number of mismatches between the plurality of bit sub-groups having the corresponding order of location in their respective bit groups and the predetermined pattern, suppressing the plurality of bit sub-groups from communicating valid information from the second DSL modem to the first DSL modem;

second, determining whether a number of successive matches between the plurality of bit groups having the corresponding order of location in their respective bit groups and the predetermined pattern has occurred; and third, responsive to the step of determining whether a number of successive matches between the plurality of bit groups having the corresponding order of location in their respective bit groups and the predetermined pattern has occurred, enabling the plurality of bit sub-groups to communicate valid information from the second DSL modem to the first DSL modem.

21. A method of communicating bit groups between a first DSL modem and a second DSL modem, comprising the steps of:

receiving at the first DSL modem a plurality of bit groups from the second DSL modem, wherein each of the plurality of bit groups comprises a plurality of bit sub-groups and each of the plurality of bit sub-groups has an order of location within its respective bit group;

for each of the plurality of bit groups, determining whether bits of a plurality of bit sub-groups having a corresponding order of location in their respective bit groups comprise at least one erroneous bit; and responsive to the determining step, storing in the first DSL modem a record of whether the plurality of bit sub-groups having the corresponding order of location in their respective bit groups comprises at least one erroneous bit;

wherein the step of determining whether bits of plurality of bit sub-groups having a corresponding order of location in their respective bit groups/comprise at least one erroneous bit comprises determining whether the bits of the plurality of bit sub-groups having the corresponding order of location in their respective bit groups match a predetermined pattern;

and wherein the storing step comprises storing in the first DSL modem a record indicating a number of mismatches between the plurality of bit sub-groups having corresponding order of location in their respective bit groups and the predetermined pattern;

and further comprising:

receiving at the second DSL modem a plurality of bit groups from the first DSL modem, wherein each of the plurality of bit groups from the first DSL modem comprises a plurality of bit sub-groups and each of the plurality of bit sub-groups from the first DSL modem has an order of location within its respective bit group;

for each of the plurality of bit groups from the first DSL modem, determining whether bits of a plurality of bit sub-groups having a corresponding order of location within their respective bit groups match a predetermined pattern; and responsive to the determining step for the plurality of bit groups from the first DSL modem, storing in the second DSL modem a record of whether the plurality of bit sub-groups having the corresponding order of location within their respective bit groups matches the predetermined pattern;

and further comprising, responsive to the record in the second DSL modem indicating a number of mismatches between the plurality of bit sub-groups having the corresponding order of location within their respective bit groups and the predetermined pattern, suppressing the plurality of bit sub-groups having the corresponding order of location within their respective bit groups from communicating valid information from the first DSL modem to the second DSL modem.

22. A method of communicating bit groups between a first DSL modem and a second DSL modem, comprising the steps of:

receiving at the first DSL modem a plurality of bit groups from the second DSL modem, wherein each of the plurality of bit groups comprises a plurality of bit sub-groups and each of the plurality of bit sub-groups has an order of location within its respective bit group;

for each of the plurality of bit groups, determining whether bits of a plurality of bit sub-groups having a corresponding order of location in their respective bit groups comprise at least one erroneous bit;

responsive to the determining step, storing in the first DSL modem a record of whether the plurality of bit sub-groups having the corresponding order of location in their respective bit groups comprises at least one erroneous bit; and responsive to the record indicating that the plurality of bit sub-groups having the corresponding order of location in their respective bit groups comprises at least one erroneous bit, suppressing the plurality of bit sub-groups having the corresponding order of location from communicating valid information from the second DSL modem to the first DSL modem.

23. The method of claim 22 wherein the suppressing step does not affect communication of filler information from the second DSL modem to the first DSL modem.

24. A method of communicating bit groups between a first DSL modem and a second DSL modem, comprising the steps of:

receiving at the first DSL modem a plurality of bit groups from the second DSL modem, wherein each of the plurality of bit groups comprises a plurality of bit sub-groups and each of the plurality of bit sub-groups has an order of location within its respective bit group;

for each of the plurality of bit groups, determining whether bits of a plurality of bit sub-groups having a corresponding order of location in their respective bit groups comprise at least one erroneous bit; and responsive to the determining step, storing in the first DSL modem a record of whether the plurality of bit sub-groups having the corresponding order of location in their respective bit groups comprises at least one erroneous bit;

wherein the first DSL modem comprises a storage circuit having a location corresponding to the corresponding order of location in the respective bit groups; and wherein the step of storing in the first DSL modem the record of whether the plurality of bit sub-groups having the corresponding order of location in their respective bit groups comprises at least one erroneous bit comprises advancing in a first direction a count in the corresponding order of location of the storage circuit in response to determining that the plurality of bit sub-groups having the corresponding order of location in their respective bit groups comprises at least one erroneous bit.

25. The method of claim 24 wherein the step of storing in the first DSL modem the record of whether the plurality of bit sub-groups having the corresponding order of location in their respective bit groups comprises at least one erroneous bit comprises advancing in a second direction the count in the corresponding order of location in the respective bit groups of the storage circuit in response to consecutive determinations that the plurality of bit sub-groups having the corresponding order of location in their respective bit groups does not comprise at least one erroneous bit.

26. A method of communicating bit groups between a first DSL modem and a second DSL modem, comprising the steps of:

receiving at the first DSL modem a plurality of bit groups from the second DSL modem, wherein each of the plurality of bit groups comprises a plurality of bit sub-groups and each of the plurality of bit sub-groups has an order of location within its respective bit group;

for each of the plurality of bit groups, determining whether bits of a plurality of sub-groups having a corresponding order of location in their respective bit groups comprise at least one erroneous bit; and responsive to the determining step, storing in the first DSL modem a record of whether the plurality of bit sub-groups having the corresponding order of location in their respective bit groups comprises at least one erroneous bit;

and further comprising:

first, responsive to the record indicating that the plurality of bit sub-groups having the corresponding order of location in their respective bit groups comprises at least one erroneous bit, suppressing the plurality of bit sub-groups from communicating valid information from the second DSL modem to the first DSL modem;

second, determining whether the record indicates consecutive determinations that the plurality of bit sub-groups having the corresponding order of location-in their respective bit groups does not comprise at least one erroneous bit; and third, responsive to the step of determining whether the record indicates consecutive determinations that the plurality of bit sub-groups having the corresponding order of location in their respective bit groups does not comprise at least one erroneous bit, enabling the plurality of bit sub-groups to communicate valid information from the second DSL modem to the first DSL modem.

27. A method of communicating bit groups between a first DSL modem and a second DSL modem, comprising the steps of:

receiving at the first DSL modem a plurality of bit groups from the second DSL modem, wherein each of the plurality of bit groups comprises a plurality of bit sub-groups and each of the plurality of bit sub-groups has an order of location within its respective bit group;

for each of the plurality of bit groups, determining whether bits of a plurality of sub-groups having a corresponding order of location in their respective bit groups comprises at least one erroneous bit;

responsive to the determining step, storing in the first DSL modem a record of whether the plurality of sub-groups having the corresponding order of location in their respective bit groups comprises at least one erroneous bit;

receiving at the second DSL modem a plurality of bit groups from the first DSL modem, wherein each of the plurality of bit groups from the first DSL modem comprises a plurality of bit sub-groups and each of the plurality of bit sub-groups from the first DSL modem has an order of location within its respective bit group;

for each of the plurality of bit groups from the first DSL modem, determining whether bits of a plurality of bit sub-groups having a corresponding order of location in their respective bit groups comprise one or more erroneous bits;

responsive to the determining step for the plurality of bit groups from the first DSL modem, storing in the second DSL modem a record of whether the plurality of bit sub-groups having the corresponding order of location in their respective bit groups comprises one or more erroneous bits; and responsive to the record in the second DSL modem indicating that the plurality of bit sub-groups having the corresponding order of location in their respective bit groups comprises one or more erroneous bits, suppressing the at least one sub-group from communicating valid information from the first DSL modem to the second DSL modem.

28. A first DSL modem operable to communicate with a second DSL modem, the first DSL modem comprising:

circuitry for receiving at the first DSL modem a plurality of bit groups from the second DSL modem, wherein each of the plurality of bit groups comprises a plurality of bit sub-groups and each of the plurality of bit sub-groups has an order of location within its respective bit group;

for each of the plurality of bit groups, circuitry for determining whether bits of a plurality of sub-groups having a corresponding order of location in their respective bit groups comprise at least one erroneous bit; and responsive to the circuitry for determining, circuitry for storing in the first DSL modem a record of whether the plurality of sub-groups having the corresponding order of location in their respective bit groups comprises at least one erroneous bit.

29. The first DSL modem of claim 28:

wherein the circuitry for determining whether bits of a plurality of bit sub-groups having a corresponding order of location in their respective bit groups comprise at least one erroneous bit comprises circuitry for determining whether the bits of the plurality of bit sub-groups having the corresponding order of location in their respective bit groups match a predetermined pattern;

and wherein the circuitry for storing comprises circuitry for storing in the first DSL modem a record of whether the plurality of bit sub-groups having the corresponding order of location in their respective bit groups matches the predetermined pattern.

30. A first DSL modem operable to communicate with a second DSL modem, the first DSL modem comprising:

circuitry for receiving at the first DSL modem a plurality of bit groups from the second DSL modem, wherein each of the plurality of bit groups comprises a plurality of bit sub-groups and each of the plurality of bit sub-groups has an order of location within its respective bit group;

for each of the plurality of bit groups, circuitry for determining whether bits of a plurality of bit sub-groups having a corresponding order of location in their respective bit groups comprise at least one erroneous bit; and responsive to the circuitry for determining, circuitry for storing in the first DSL modem a record of whether the plurality of bit sub-groups having the corresponding order of location in their respective bit groups comprises at least one erroneous bit;

wherein the circuitry for determining whether bits of at least one sub-group having a corresponding order of location in their respective bit groups comprise at least one erroneous bit comprises circuitry for determining whether the bits of the plurality of bit sub-groups having the corresponding order of location in their respective bit groups match a predetermined pattern;

wherein the circuitry for storing comprises circuitry for storing in the first DSL modem a record indicating a number of matches and a number of mismatches between the plurality of bit sub-groups having the corresponding order of location in their respective bit groups matches the predetermined pattern;

and further comprising, responsive to the record indicating a number of mismatches between the plurality of bit sub-groups having the corresponding order of location in their respective bit groups and the predetermined pattern, circuitry for suppressing the plurality of bit sub-groups from communicating valid information from the second DSL modem to the first DSL modem.

31. The first DSL modem of claim 30 wherein the circuitry for suppressing comprises circuitry for suppressing the plurality of bit sub-groups from communicating either valid user information or valid system information from the second DSL modem to the first DSL modem.

32. The first DSL modem of claim 30 wherein the circuitry for suppressing step does not affect communication of filler information from the second DSL modem to the first DSL modem.

33. A first DSL modem operable to communicate with a second DSL modem, the first DSL modem comprising:

circuitry for receiving at the first DSL modem a plurality of bit groups from the second DSL modem, wherein each of the plurality of bit groups comprises a plurality of bit sub-groups and each of the plurality of bit sub-groups has an order of location within its respective bit group;

for each of the plurality of bit groups, circuitry for determining whether bits of a plurality of bit sub-groups having a corresponding order of location in their respective bit groups comprise at least one erroneous bit; and responsive to the circuitry for determining, circuitry for storing in the first DSL modem a record of whether the plurality of bit sub-groups having the corresponding order of location in their respective bit groups comprises at least one erroneous bit;

wherein the circuitry for determining whether bits of at least one sub-group having a corresponding order of location in their respective bit groups comprise at least one erroneous bit comprises circuitry for determining whether the bits of the plurality of bit sub-groups having the corresponding order of location in their respective bit groups match a predetermined pattern;

and wherein the circuitry for storing comprises circuitry for storing in the first DSL modem a record of whether the plurality of bit sub-groups having the corresponding order of location in their respective bit groups matches the predetermined pattern; and further comprising a storage circuit having a location corresponding to the corresponding order of location in the respective bit groups; and wherein the circuitry for storing in the first DSL modem the record of whether the plurality of bit sub-groups having the corresponding order of location in their respective bit groups matches the predetermined pattern comprises circuitry for advancing in a first direction a count in the corresponding order of location in the respective bit groups of the circuitry for storing in response to a mis-match between the plurality of bit sub-groups and the predetermined pattern.

34. The first DSL modem of claim 33 wherein the circuitry for storing in the first DSL modem the record of whether the plurality of bit sub-groups having the corresponding order of location in their respective bit groups matches the predetermined pattern comprises circuitry for advancing in a second direction the count in the common order of location of the storage circuit in response to consecutive matches between the plurality of bit sub-groups and the predetermined pattern.

* * * * *